United States Patent [19]

Wu

[11] Patent Number: 5,521,241
[45] Date of Patent: May 28, 1996

[54] STYRENE COPOLYMER–BASED PLASTISOL CONTAINING GLYCIDYL METHACRYLATE

[75] Inventor: Shao-hai Wu, Ellicott City, Md.

[73] Assignee: W. R. Grace & Co.-Conn., New York, N.Y.

[21] Appl. No.: 298,485

[22] Filed: Aug. 30, 1994

[51] Int. Cl.[6] ........................................... C08K 5/09
[52] U.S. Cl. ............................................ 524/297; 524/547
[58] Field of Search ................................ 524/547, 297

[56] References Cited

U.S. PATENT DOCUMENTS

| | | | |
|---|---|---|---|
| 3,925,280 | 12/1975 | Lundberg et al. | 260/23 |
| 4,014,847 | 3/1977 | Lundberg et al. | 260/33.4 R |
| 4,145,379 | 3/1979 | Lundberg et al. | 260/879 |
| 4,214,965 | 7/1980 | Rowe | 204/159.15 |
| 4,425,455 | 1/1984 | Turner et al. | 524/158 |

OTHER PUBLICATIONS

"Preparation of Highly Sulfonated Polystyrene Model Colloids" –J. H. Kim et al., J. Polymer Sci: Part A: Polymer Chemistry, vol. 27, 3187–3199 (1989).

Primary Examiner—Peter D. Mulcahy
Attorney, Agent, or Firm—Valerie E. Looper

[57] ABSTRACT

A styrene ionomeric composition is disclosed for use in plastisols. Polystyrene ionomers such as sulfonated polystyrene or carboxylated polystyrenes with covalent crosslinks, exhibit improved general mechanical properties when small amounts of a latent crosslinking monomer such as glycidyl methacrylate are added.

6 Claims, No Drawings

STYRENE COPOLYMER- BASED PLASTISOL CONTAINING GLYCIDYL METHACRYLATE

FIELD OF THE INVENTION

This application relates to non-PVC plastisols. More specifically, it relates to copolymers made of sulfonated or carboxylated polystyrene which can be used instead of polymers made of vinyl chloride ("PVC") to make plastisol sealants for containers. It has been found that if a small amount of crosslinking comonomer is added to the polymer, the resulting plastisol will exhibit improved thermal deformation resistance, and also that the addition of another reactive monomer, preferably glycidyl methacrylate, improves its general mechanical properties. In particular, good storage stability, rapid fusibility and excellent thermal mechanical properties of the fused plastisol products can be achieved.

BACKGROUND OF THE INVENTION

Container sealants are needed to preserve the quality of canned and bottled goods. At present, plastisols based on PVC are widely used because they offer good technical solutions to a number of problems faced by canners and bottlers. Plastisols made with PVC are flexible, exhibit good adhesion to metal, can be formulated as a low viscosity film or coating, do not add a taste or smell to a packaged food or beverage, and are relatively inexpensive to produce. On the other hand, the raw materials do contain chlorine, which has become the subject of environmental concern.

Chlorine, which is essential to life and is found in common table salt, is a highly reactive element which exerts a profound effect on molecules that contain it. Many chlorinated organic compounds are highly reactive, and many, including the vinyl chloride monomer used to make the PVC polymer, are carcinogens. Further, improper incineration of materials that contain PVC can produce hydrogen chloride (a corrosive acid) and dioxins (which are poisonous). Since many communities world-wide are incinerating municipal solid waste, there is a demand to reduce the use of PVC rather than depend upon the proper incineration of waste every time.

It can be seen, therefore, that there is a need for a non-PVC plastisol, particularly where environmental concerns exist.

Plastisols are essentially blends of finely divided thermoplastic polymers suspended in a liquid medium, or plasticizer. Plastisols are particularly useful as an aid to handling polymers which would otherwise exist in a highly viscous or semi-solid state. U.S. Pat. No. 3,925,280, issued to Lundberg et al. Dec. 9, 1975 discloses that broad classes of thermoplastic materials, including graft or block copolymers as well as various ionomers, can be powdered and then blended with plasticizers to produce a suspension which is useful for making thin layers or coatings. The suspension is simply applied to a surface of an article and heated to a softening point of the polymer. A liquid-solid transition occurs upon heating, producing a plasticized semi-rigid or elastomeric product of high strength.

In U.S. Pat. No. 4,014,847, issued to Lundberg et al. Mar. 29, 1977, it is further disclosed that certain polar plasticizers such as glycerol are compatible with various ionomers including sulfonated polystyrenes. No particular end use for the resulting suspensions is disclosed.

U.S. Pat. No. 4,425,455 issued to Turner et al. Jan. 10, 1984 discloses that sulfonated thermoplastic polymers, including copolymers of sodium styrene sulfonate with styrene, vinyl toluene or t-butyl styrene, can be blended with a polar cosolvent (plasticizer) for use in a drilling mud.

A method of making styrene and sodium styrene sulfonate (Sty/NaSS) copolymers is disclosed in J. H. Kim et al., "Preparation of Highly Sulfonated Polystyrene Model Colloids" J. Polymer Sci: Part A: Polymer Chemistry, Vol. 27, 3187–3199 (1989). End uses of the resulting materials are not discussed.

Copending application U.S. Ser. No. 208,764 filed Mar. 8, 1994, and issued as U.S. Pat. No. 5,387,633 on Feb. 7, 1995. "Styrene/Sodium Styrene Sulfonate Copolymers for Plastisol Sealant" disclosed the use of the base copolymers of the present invention for making plastisols.

The present inventor has found that incorporation of small amounts of glycidyl methacrylate (GMA) improves the general mechanical properties of the fused plastisol materials. The mechanism of such improvement likely involves crosslinking chemistry at the process of plastisol fusion, which results in improved integrity of the film.

OBJECTS OF THE INVENTION

It is an object of the present invention to produce a non-PVC plastisol suitable for use as a sealant for containers.

Another object of the invention is to make an improved non-PVC plastisol, one which exhibits improved thermal deformation resistance.

Yet another object of the invention is to make an improved non-PVC plastisol having a high rate of fusion in addition to excellent thermal deformation resistance.

These and other objects and advantages of the invention can be accomplished using sulfonated or carboxylated polystyrene ionomers which are lightly crosslinked with, for example, divinyl benzene, to which a small amount of glycidyl methacrylate has also been added during the polymerization step, for use as sealants. The presently described materials exhibit good plastisol stability, fast fusion speed, high strength in the fused plastisol and excellent thermal mechanical properties.

DETAILED DESCRIPTION OF THE INVENTION

Plastisols are useful as a means of handling polymers which are highly viscous and may be sensitive to heat. Processes utilizing plastisols can function as an alternative to other methods which employ massive machinery to extrude, mold or calender the highly viscous molten polymer. The plastisol is a suspension having a solids content of about 15–75 weight % of finely divided polymer in a compatible plasticizer. Polymer particle size is preferably about 10 to 50 microns in diameter. It is desirable that the suspension has a reasonable degree of shelf stability. That is, no substantial change in viscosity or physical appearance should occur at ambient temperature over a period of hours or days, depending on the application. The suspension can easily be coated or flowed onto an object and heated to induce a liquid-solid transition due to plasticization of the polymer. Upon cooling, the product is a plasticized semi-rigid or elastomeric product of high strength.

The Ionomers

The polystyrene ionomer is lightly covalently crosslinked with di- or multi-unsaturated monomers or oligomers incorporated in the emulsion polymerization step. Styrene is copolymerized with a polar monomer such as sulfonated styrene or a low molecular weight carboxylic acid-containing monomer such as acrylic acid or methacrylic acid. Preferably, the polar monomer is employed in its salt form, or the resulting polymer is subsequently partially or completely neutralized to form the corresponding salt groups. In general, the content of the polar groups is in the range of about 1–15 molar percent.

The effective use of styrene/sodium styrene sulfonate (Sty/NaSS) copolymers in plastisols has been described in copending application, U.S. Ser. No. 208,764 filed Mar. 8, 1994 "Styrene/sodium styrene sulfonate copolymer for plastisol sealant". The use of a crosslinker is described in copending application, U.S. Ser. No. 207,761 filed Mar. 8, 1994, now abandoned "Styrene Ionomer Compositions with Covalent Crosslinks for Use in Plastisols". The text of both applications is incorporated herein by reference as if set forth in full.

The present copolymers are preferably prepared by emulsion polymerization of styrene and a first comonomer which is a metal salt of styrene sulfonic acid, preferably sodium styrene sulfonate, and a second comonomer which is a crosslinkable material, that is, one containing two or more polymerizable double bonds, as well as a third comonomer, which has a latent crosslinking group, using a water soluble initiator. Typical examples of initiators include potassium persulfate, ammonium persulfate, and t-butyl hydroperoxide. Of these, potassium persulfate is preferred.

The amount of the first, or polar, comonomer should be about 2–10 weight percent of the copolymer, preferably 2–6 weight percent, and most preferably in the range of 4–5 weight percent. If the first comonomer content is too low, the plastisol will be unstable and the fused product will be weak. If the first comonomer content is too high, the polymer will have poor compatibility with the plasticizer and will fuse too slowly.

The second or crosslinking comonomer can include monomers or low molecular weight oligomers having two or more polymerizable double bonds. Examples include divinylbenzene ("DVB") and polyalkylene glycol diacrylates and di(methacrylates) as well as polyol triacrylates and trimethacrylates. DVB is preferred. The amount of the crosslinking comonomer is critical. If the concentration is too high, the polymer will be too highly crosslinked, resulting in slow fusion when fluxed. A suitable concentration is about 0.01 to 1.0 mole percent, preferably 0.05 to 0.2 mole percent.

The third comonomer has a latent crosslinking group and can include monomers or oligomers having at least one polymerizable double bond and at least one electrophilic functional group. The latent crosslinking group is preferably heat activated. Unsaturated epoxy materials are useable, and glycidyl methacrylate ("GMA") is preferred.

Although the mechanism is not clearly understood, it is believed that the monomer or oligomer is incorporated into the polymer backbone during the polymerization step. The polymerization reaction can be run at a temperature less than the temperature required to activate the crosslinking group. For example, the emulsion polymerizations in the Examples were run at less than 100° C. The polymer then can be dried and powdered and formulated into a plastisol, all without activating the latent crosslinking group. Upon fusion, which takes place at a significantly higher temperature (200° C. in the Examples) the crosslinking group is activated, and crosslinking proceeds quickly. The result is a fused polymeric product with "internal" crosslinking by virtue of the second comonomer as well as "external" crosslinking from use of the third comonomer. A suitable concentration of the third comonomer is 0.1 to 10 mole percent, preferably 0.5 to 5 mole percent, and even more preferably about 1–2 mole percent. Too little of the latent crosslinking monomer yields no effect; too much will cause the plastisol fusion properties to deteriorate.

The copolymer emulsion is spray dried or pulverized and the resulting powder is dispersed in plasticizer to make a plastisol. The plastisol is typically formulated as a blend of 100 parts by weight resin particles with about 80 to 100 parts by weight of a plasticizer.

The Plasticizers:

Operable plasticizers include most of those commonly used for PVC plastisols. They include alkyl phthalates, isophthalates and terephthalates, especially di-2-ethylhexyl phthalate (commonly called dioctyl phthalate), diisononyl phthalate and other alkyl phthalates having alkyl groups of 2–20 carbons, especially 7–12 carbons, either branched or unbranched, and mixtures thereof. Also included are alkyl aryl phthalates such as butyl benzyl phthalate. Other operable classes of plasticizers are dialkyl adipates, dialkyl glutarates, dialkyl azelates, dialkyl sebacates and trialkyl trimellitates, where alkyl groups are as defined as above for the phthalates. Also operable are polyether or polyester dibenzoates such as polyethylene glycol 200 dibenzoate. Another class of operable plasticizers are the citrates, as exemplified by tributyl citrate and acetyl tributyl citrate. Another class of plasticizers are the phosphate esters such as tricresyl phosphate, isopropylated triphenyl phosphate and mixtures thereof. Other operable plasticizers include epoxidized natural products such as epoxidized soybean oil and epoxidized 2-ethylhexyl tallate. Another operable plasticizer is N-ethyltoluenesulfonamide. Many other plasticizers not explicitly mentioned above are also believed to be operable.

The following Examples serve to illustrate the invention without limiting its scope or the scope of the claims which follow.

General Procedure for Emulsion Polymerization

Water (amount to make a 25% solids final emulsion), and sodium styrene sulfonate, were mixed in a 1 or 4 l resin kettle under nitrogen and heated to 70° C. DOWFAX 2EP (surfactant: a 50% solution of sodium dodecyl diphenyloxide disulfonate available from Dow Chemical Company, Midland, Mich.) was added, followed by styrene, divinylbenzene, and preferably glycidyl methacrylate (monomers). Potassium persulfate (initiator) was added and the temperature was maintained at 70° C. for 6 hours to complete the polymerization.

Example 1

Emulsion Polymerization

To a 1-liter resin kettle was added 580 g of distilled water, 2.0 g of Dowfax 2Ep surfactant, and 8 g of sodium styrene sulfonate. The mixture was stirred at 275 rpm under nitrogen until dissolved, and 188 g of styrene, 0.2 g of divinylbenzene (DVB) and 4 g of glycidyl methacrylate (GMA) were added. The mixture was heated to 70° C. while being stirred for 6 hours. After cooling, the emulsion was filtered through a 100 mesh sieve and was ready for drying.

The emulsion was dried in a oven at 90° C. for 16 hours. The dried solid was then mill-ground to form a powder with a particle size in the range of 1–50 μm.

Example 2

Plastisol Preparation and Curing

A liquid plastisol was prepared by mixing 100 parts by weight of a polymer from Example 1 with 80 parts by weight of di-2-ethylhexyl phthalate (di-octyl phthalate, or DOP).

To prepare and test a fused plastisol film, about 5 g of plastisol sample was spread on a Teflon film to make a sheet of about 2–3 mm thickness. The plastisol sheet was degassed under vacuum for two hours at room temperature, and was fused in a 200° C. oven for 2–5 minutes. After cooling to room temperature, the fused plastisol film appeared transparent, flexible, elastomeric and strong.

Example 3

Thermal Penetration Resistance

A sample of plastisol film fused for 2 minutes at 200° C. produced from Example 2 and a control sample made without the added GMA were subjected to thermomechanical analysis to measure the thermal deformation resistance. A fused plastisol film was made using PVC according to Example 2 was also run for comparison.

The test was run on a TA Instruments TGMA 2940 using a 3.0 mm diameter hemispherical probe with a load of 50 g and heating from 25 to 150° C. at a rate of 4° C./min. The penetration distance (in percent of original thickness) was recorded as a function of temperature.

| T °C. | Sty/NaSS/DVB | Sty/NaSS/DVB/GMA | PVC |
|---|---|---|---|
| 100° C. | 40% | 20% | 25% |
| 125° C. | 47% | 22% | 47% |
| 150° C. | 55% | 24% | 85% |

From these results, it is clear that the Sty/NaSS/DVB plastisol has improved deformation resistance at higher temperatures when compared with PVC, and also that further improvement can be obtained by adding GMA.

Example 4

Tensile Modulus

The tests of the plastisol films were run on a Perkin Elmer TMA System 7, using a tensile elongation testing mode at 25° C., 50° C. and 90° C. isothermally. Tensile moduli of samples are listed below:

| Sample | Fusion Time | Modulus ($10^5$ Pa) | | |
|---|---|---|---|---|
| | | 25° C. | 50° C. | 90° C. |
| 1. Sty/NaSS/DVB | 2 min. | 5.2 | 2.6 | 2.2 |
| (96/4/0.1) | 5 min. | 4.0 | 1.8 | 1.8 |
| 2. Sty/NaSS/DVB/GMA | 2 min. | 8.0 | 3.1 | 3.3 |
| (95/4/0.1/1) | 5 min. | 7.5 | 3.6 | 2.6 |
| 3. Sty/NaSS/DVB/GMA | 2 min. | 11 | 5.1 | 3.4 |
| (94/4/0.1/2) | 5 min. | 9.5 | 5.1 | 3.2 |

These results show that modulus is improved by adding 1% GMA. Further improvement is obtained by adding 2% GMA. This effect is particularly pronounced at room temperature. The modulus is affected by fusion time, and a fusion time of 2 minutes yields better results than 5 minutes.

What is claimed:

1. A plastisol for a sealant made of a plasticizer and an ionomer or blend of ionomers consisting essentially of styrene, 1–15 molar percent polar monomer selected from the group consisting of sulfonated styrene, acrylic acid, and methacrylic acid, about 0.01 to 1.0 mole percent of a crosslinking agent which is a monomer or low molecular weight oligomer having two or more polymerizable double bonds, and glycidyl methacrylate.

2. The plastisol of claim 1, wherein the polar monomer is sulfonated styrene.

3. The plastisol of claim 1, wherein the polar monomer is sodium styrene sulfonate.

4. The plastisol of claim 1, further comprising 0.1 to 10 mole percent glycidyl methacrylate.

5. The plastisol of claim 1, wherein the crosslinking agent is divinylbenzene.

6. The plastisol of claim 1, wherein the plasticizer is di-2-ethylhexyl phthalate, diisononyl phthalate, or mixtures thereof.

\* \* \* \* \*